(12) United States Patent
Garrison et al.

(10) Patent No.: US 6,322,123 B1
(45) Date of Patent: Nov. 27, 2001

(54) VEHICLE REAR STORAGE DRAWER

(75) Inventors: William Grant Garrison, Dearborn Heights; Jeffrey M. Nowak, Huntington Woods; Thomas Scott, Bloomfield Hills, all of MI (US)

(73) Assignee: Ford Global Technologies, Inc., Dearborn, MI (US)

( * ) Notice: Subject to any disclaimer, the term of this patent is extended or adjusted under 35 U.S.C. 154(b) by 0 days.

(21) Appl. No.: 09/736,757

(22) Filed: Dec. 14, 2000

Related U.S. Application Data

(60) Provisional application No. 60/175,325, filed on Jan. 10, 2000.

(51) Int. Cl.[7] .................................................. B62D 33/08
(52) U.S. Cl. ...................... 296/26.1; 296/37.1; 296/37.8; 296/37.16; 224/400; 224/401; 224/274
(58) Field of Search ................................. 296/26.1, 26.14, 296/37.1, 37.6, 37.8, 37.12, 37.16; 224/400, 401, 274, 281, 282, 488, 320; 220/522

(56) References Cited

U.S. PATENT DOCUMENTS

| | | |
|---|---|---|
| 1,600,830 * | 9/1926 | Lewis . |
| 2,490,014 | 12/1949 | Brand . |
| 3,078,133 * | 2/1963 | Schauer ............................. 312/321.5 |
| 4,717,024 * | 1/1988 | Djezovic .............................. 206/581 |
| 4,749,211 | 6/1988 | Kosuge . |
| 4,936,463 * | 6/1990 | Tiramani .............................. 206/581 |
| 5,060,899 * | 10/1991 | Lorence et al. .................. 224/401 X |
| 5,125,710 | 6/1992 | Gianelo . |
| 5,150,939 | 9/1992 | Simin . |
| 5,192,108 | 3/1993 | Richardson et al. . |
| 5,246,020 * | 9/1993 | Wu ....................................... 132/295 |
| 5,330,146 * | 7/1994 | Spykerman ...................... 224/281 X |
| 5,358,100 * | 10/1994 | Wolff .................................... 206/749 |
| 5,487,519 * | 1/1996 | Grabowski ....................... 224/281 X |
| 5,489,054 * | 2/1996 | Schiff ................................... 224/281 |
| 5,501,504 | 3/1996 | Kunz . |
| 5,749,554 * | 5/1998 | Avila et al. ...................... 224/281 X |
| 6,183,029 * | 2/2001 | Deaton ................................ 296/37.1 |

* cited by examiner

Primary Examiner—Stephen T. Gordon
Assistant Examiner—Lori L. Coletta
(74) Attorney, Agent, or Firm—Damian Pecari; William J. Coughlin

(57) ABSTRACT

According to the present invention, a storage compartment for the rear end of a speciality vehicle is provided. The storage compartment has a primary compartment that is slidably mounted to the vehicle body. Sub-compartments are pivotally connected to the side walls of the primary compartment. The sub-compartments are pivoted from a closed position wherein the sub-compartments overlie a base portion of the primary compartment to a open position wherein the sub-compartments are pivoted on a pivot connection to a position wherein they are outboard of the base. A deck lid is provided to enclose the storage compartment.

17 Claims, 3 Drawing Sheets

VEHICLE REAR STORAGE DRAWER

CROSS-REFERENCE TO RELATED APPLICATIONS

This application claims the benefit of U.S. Provisional application Serial No. 60/175,325, filed Jan. 10, 2000.

TECHNICAL FIELD

The present invention relates to a storage compartment for a vehicle that slides open from the rear of the vehicle for access to the storage compartment.

BACKGROUND ART

Specialty vehicles such golf carts and utility vehicles are used for a wide variety of purposes. Such vehicles are generally smaller then normal motor vehicles. Due to the small size of such vehicles, the quantity of useable storage space is limited.

Storage facilities provided by such vehicles generally consist of golf bag supports and open baskets if the vehicle is a golf cart. For utility vehicles, generally an open platform is provided on which objects to be stored may be placed.

In the design of speciality vehicles, cost and weight constraints must be addressed by providing economical manufacturing techniques that utilize lightweight components.

A promising new market for speciality vehicles is the market for electric personal mobility vehicles designed for commuting around closed communities, industrial sites, resorts and golf courses. There is a need for zero emission electric vehicles having a modular design that provides flexibility for personalizing the vehicle for storing a wide variety of objects. A challenge for such vehicle is to provide useful storage space including closed and/or open storage for a wide variety of articles.

These and other problems and objectives are addressed by applicants' invention as summarized below.

DISCLOSURE OF INVENTION

According to the present invention, a foldout trunk for an electric vehicle is provided that pulls out from the rear of the vehicle to provide access to a storage compartment in the foldout trunk. According to the invention, a bottom portion of the foldout trunk pulls out from the rear of the vehicle, and pivotable trays are then shifted to a use position. In this way, substantial closed and open storage capacity may be provided.

According to one aspect of the present invention, a rear storage compartment for a vehicle is provided that comprises a primary compartment mounted on the vehicle for sliding movement between a closed and open position. At least one storage compartment is pivotally mounted to the primary compartment to be pivoted between a first position overlying the primary compartment and a second position not overlying the primary compartment when the primary compartment is in its open position.

According to other aspects of the invention, two storage compartments may be pivotally mounted to the primary compartment. The primary compartment has two side walls to which the two storage compartments are mounted.

According to other additional, more specific aspects of the invention, the primary compartment may have at least one side wall extending rearwardly from a front wall of the primary compartment. The primary compartment includes a face plate attached to a rear edge of the primary compartment. When the primary compartment is shifted rearwardly, a gap is formed between the side wall and the face plate, and the storage compartment may be pivoted from a first position adjacent to side walls to a second position filling the gap formed when the primary component is in its open position.

According to yet another aspect of the invention, the storage compartment may have a recess in which the face plate is partially received when the storage compartment is in its second position to selectively lock the storage compartment in its second position.

The present invention also comprehends providing a cover that is pivotally secured to the vehicle and movable between an open position wherein access is provided to the primary compartment and a pivotally mounted storage compartment and a closed position wherein the primary compartment is retained in its closed position by the cover.

The present invention also relates to a storage compartment for a speciality vehicle having a body including a rear end portion defining a space in which the storage compartment is received. The storage compartment comprises a base connected by a slide guide to the body adjacent this base defined by the rear end portion of the body. The base is movable between a closed position in which it is confined within the space defined by the rear end portion of the body and an open position in which the base is at least partially disposed behind the rear end portion of the body. A face plate is attached to a rear edge of the base. A side sub-compartment is pivotally attached to the body adjacent the space defined by the rear end portion of the body. The side sub-compartment is pivoted between a retracted position in which it is within the space defined by the rear end portion of the body and an extended position in which it is behind the rear end portion of the body and laterally outboard of the base.

According to the invention, the side sub-compartment may have a bottom wall and a side wall that define an open top container. The side wall has a portion that at least partially defines a lateral wall of a central storage compartment in conjunction with a base and face plate when the base is in its open position. Two sub-compartments may be provided that at least partially define opposite side walls of the central storage compartment. The side sub-compartments preferably have first and second planar walls joined in a right angle relationship on one end of each planar wall and a curved wall joining another end of the planar walls. The side sub-compartment may be rotated 180 degrees as it is moved from the retracted position to the extended position so that one of the planar walls is rotated from a first position overlying a side of the space defined by the rear end portion of the body to a second position wherein the planar wall extends rearwardly to the face plate when the base is in its open position.

According to another aspect of the invention, a rear deck lid may be connected by hinge to the body of the vehicle that is movable between an open position and a closed position wherein the deck lid covers an opening in the body of the vehicle above the base plate when it is in the closed position. The deck lid covers a convenient closed storage compartment when the base is in its closed position and the side sub-compartments are retracted.

The invention may also be characterized as a storage drawer for a vehicle body having a compact configuration defining a compact perimeter. The storage drawer comprises a pullout drawer having a face plate and base plate. The pullout drawer is movable on at least one drawer slide between a closed position wherein the pullout drawer is disposed within the compact perimeter and an opened position wherein the pullout drawer is extended outside of the compact perimeter. At least one drawer compartment is pivotally secured to the pullout drawer and is movable between a closed position wherein the drawer compartment is within the compact vehicle perimeter and an open position wherein the drawer compartment is disposed rearward of the compact vehicle perimeter and laterally outboard of the pullout drawer. A rear deck lid is connected by hinge to the body of the vehicle. The deck lid is movable between an open position and a closed position wherein the deck lid covers an opening in the body of the vehicle above the pullout drawer when the pullout drawer is in the closed position.

According to yet another aspect of the invention, the drawer compartment has a bottom wall and side walls that define an open top container. The side walls partially define lateral walls of the storage compartment when the base is in its open position. The two drawer compartments include first and second planar walls joined in a right angle relationship on one end of each planar wall, and a curved wall joins another end of the planar walls. Each of the drawer compartments are rotated as they are moved between the retracted position and their extended position so that each drawer compartment is rotated from a first position overlying the pullout drawer to a second position wherein each of the drawer compartments is laterally outboard of the pullout drawer.

These and other objects and advantages of the present invention are better understood in view of the attached drawings and in light of the following detailed description of the best mode for practicing the invention.

BEST MODE FOR CARRYING OUT THE INVENTION

Figure 1:
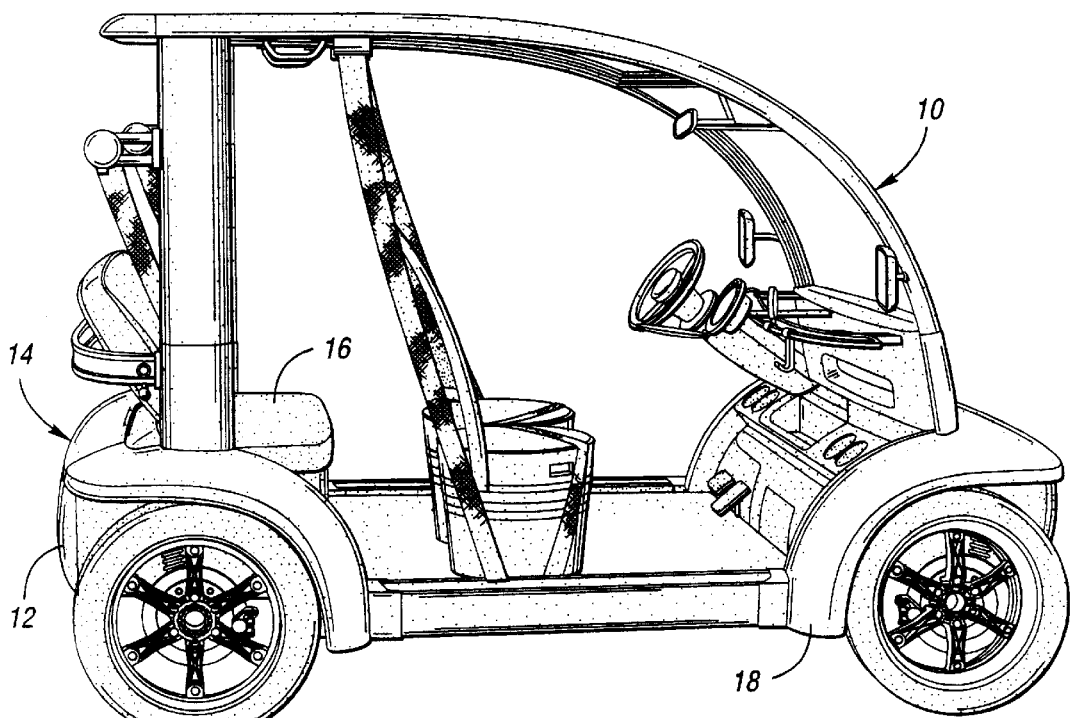
FIG. 1 is a side perspective view of a speciality vehicle having a storage compartment made in accordance with the present invention.

Referring now to FIG. 1, a speciality vehicle 10 is shown that has a storage compartment 12, or drawer, disposed in the rear end 14 of the vehicle 10 below the rear seat 16. The specialty vehicle 10 has a vehicle body 18 on which the primary compartment 20, or pullout drawer, is mounted. The primary compartment 20 has a base 22 and at least one but preferably two sub-compartments 24 that may also be referred to as side sub-compartments or drawers. The sub-compartments 24 are attached by a pivot connector 26 such as a pin, or hinge, that connect the sub-compartments 24 to one or more side walls 28 of the primary compartment 20. A front wall 30 is provided in the primary compartment 20. A cover 32, or deck lid, is secured to the vehicle body 18 to cover the primary compartment 20 when it is in a closed position.

A face plate 34 is joined to the rear edge of the base 22. The exterior side of the face plate 34 forms a portion of the exterior of the vehicle body 18. The inner side of the face plate 34 forms the rear wall of the primary compartment 20. Brake lights 36 and tail lights 38 may be provided on the face plate 34.

Figure 2:
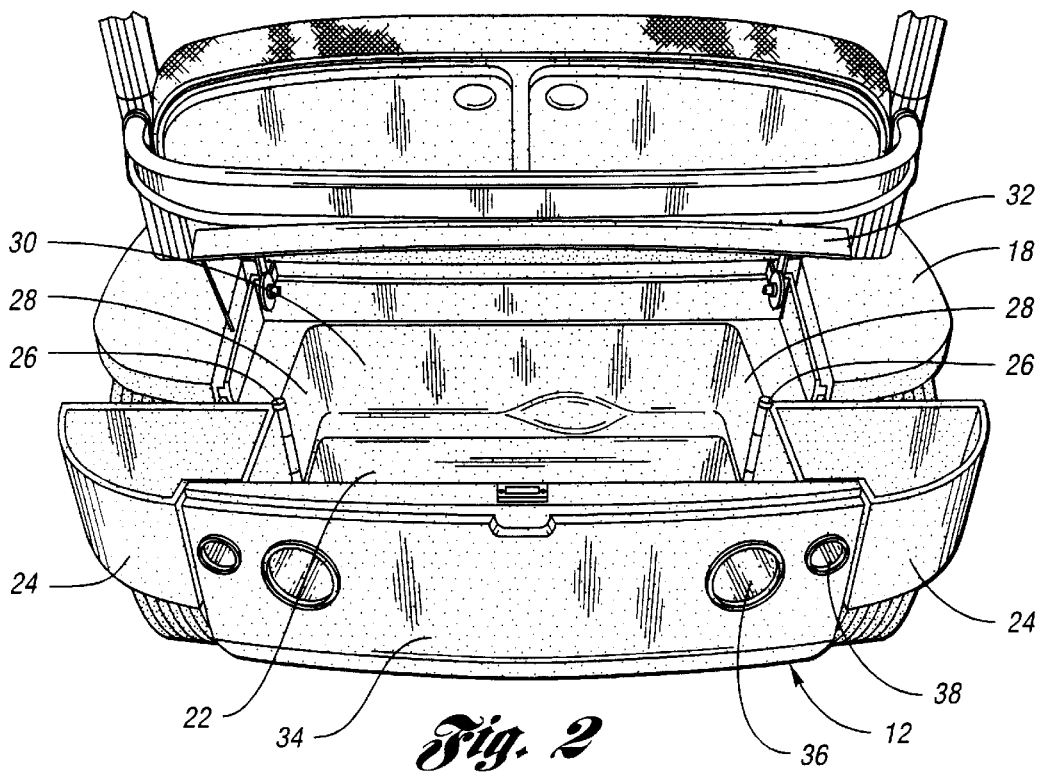
FIG. 2 is a fragmentary rear perspective view of a rear storage compartment provided on a speciality vehicle in its open position.

The sub-compartments 24 include a first wall 40 and a second wall 42 that are joined at right angles on one edge and are interconnected by a curved wall 44 on their other edges. The sub-compartment 24 as shown is generally a quarter pie shaped open top container that provides additional storage when the primary compartment 20 is open and the sub-compartments 24 are pivoted to the position shown in FIG. 2. A recess 46 is formed in the curved wall 44. The face plate 34 of the primary compartment 20 is received in the recess 46 to lock the sub-compartments 24 in the position shown in FIG. 2.

Figure 3:
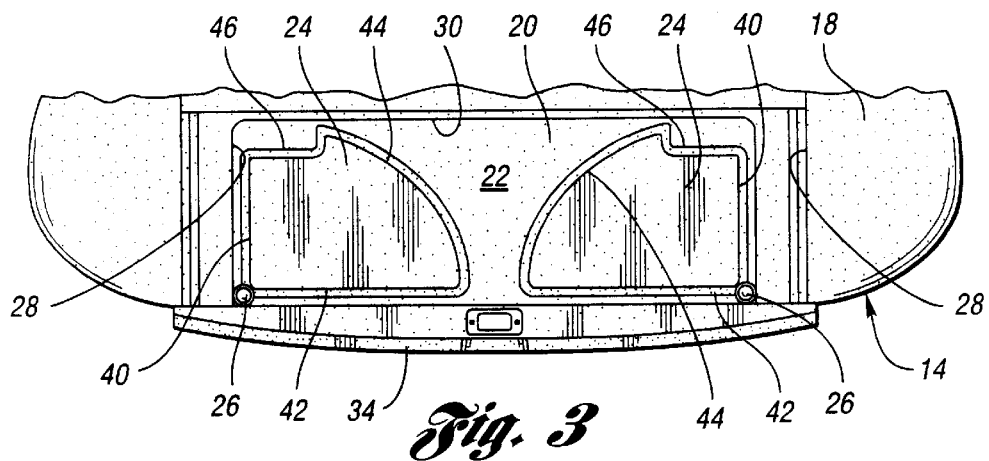
FIG. 3 is a fragmentary top plan view of a rear storage compartment in its closed position.
Figure 4:
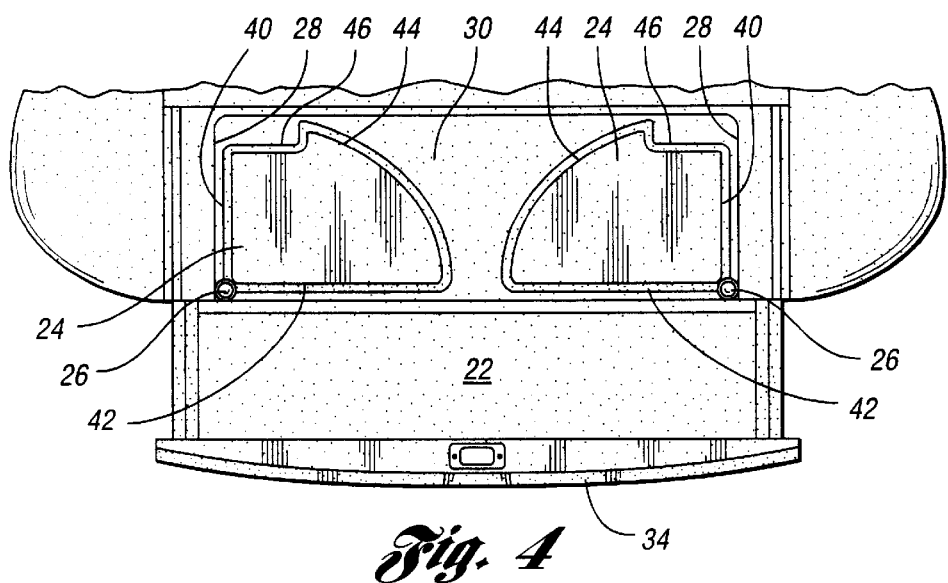
FIG. 4 is a fragmentary top plan view of a rear storage compartment in its partially open position.
Figure 5:
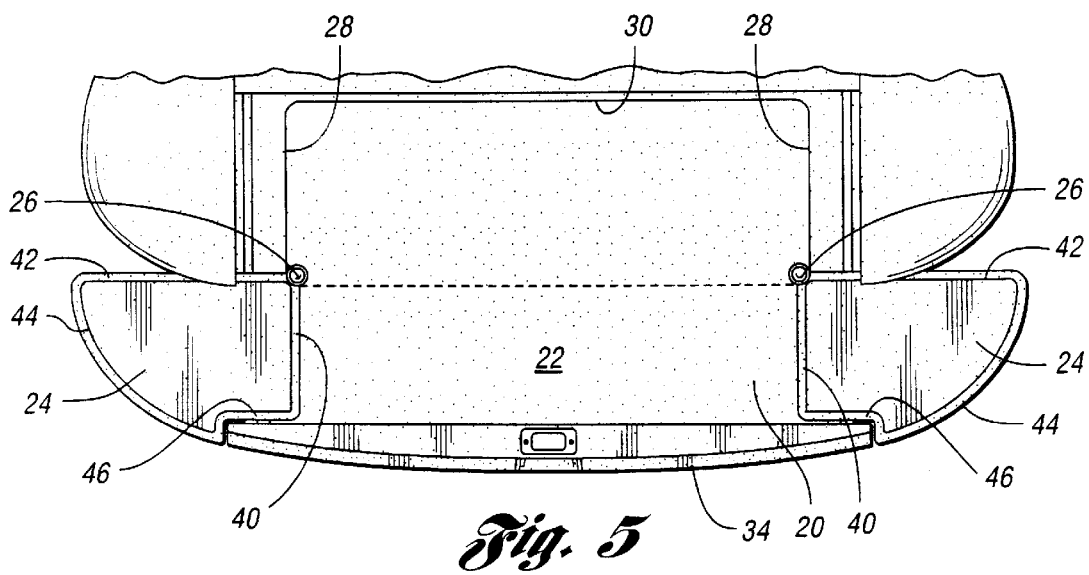
FIG. 5 is a fragmentary top plan view of a rear storage compartment in its full open position.

Referring now to FIGS. 3–5, deployment of the storage compartment is shown in a series of views progressing from the closed position to the fully open position. In the closed position shown in FIG. 3, the face plate 34 is shown generally flush with the rear end 14 of the vehicle body 18. The sub-compartments 24 are disposed over the base 22 of the primary compartment 20 with a first wall 40 of each sub-compartment 24 adjacent a side wall 28 of the primary compartment.

Referring to FIG. 4, the first step in deploying the storage compartment is illustrated wherein the face plate 34 is pulled out from the rear end 14 of the vehicle body 18 while the sub-compartments 24 are maintained in the same position shown in FIG. 3.

Referring now to FIG. 5, the storage compartment 12 is shown in its fully open position with the sub-compartments 24 being rotated on the pivot connectors 26 so that they are generally outboard of the base 22 of the primary compartment 20. The primary compartment 20 is shown with the face plate disposed in the recesses 46 of the side compartments 24 thereby locking the sub-compartments 24 in their open position. As shown in FIG. 5, the storage compartment 12 provides storage space over the base 22 and in each of the sub-compartments 24.

Figure 6:
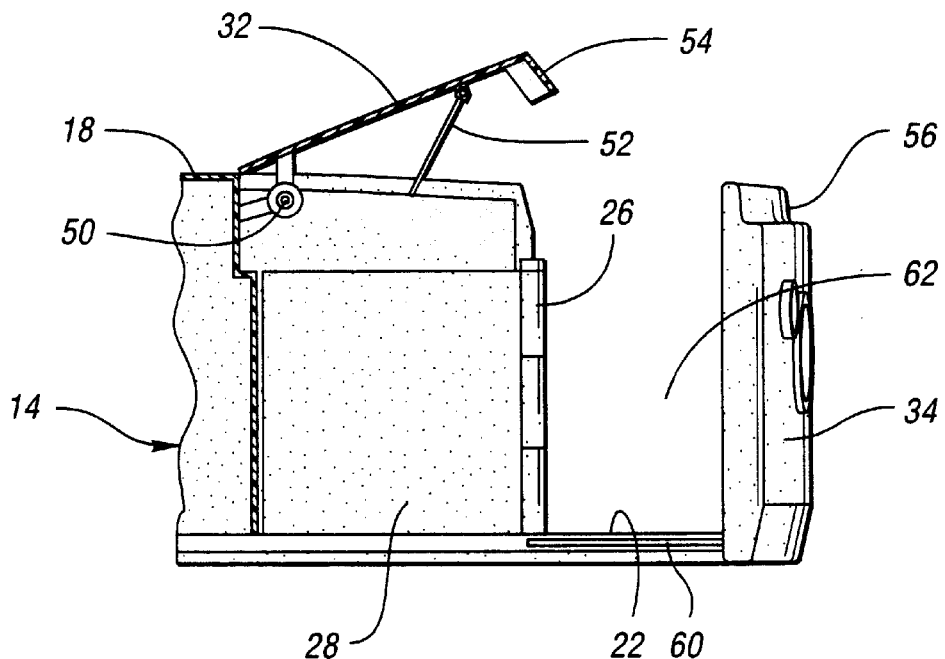
FIG. 6 is a fragmentary side elevation view partially in cross section showing the rear storage compartment in its partially open position.
Figure 7:
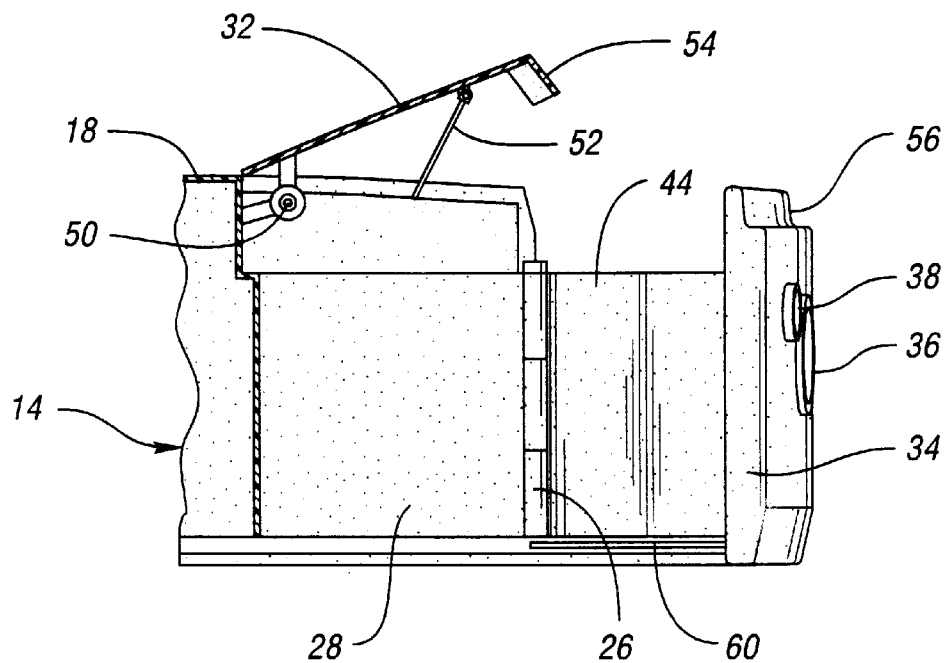
FIG. 7 is a side elevation view partially in cross section showing the rear storage compartment in its full open position.

Referring now to FIGS. 6 and 7 that generally correspond to FIGS. 4 and 5, the storage compartment 12 is shown in its partially open position in FIG. 6 and in its fully open position in FIG. 7. In these views, portions of the vehicle body 18 are shown in cross-section to provide a clear view of the components of the storage compartment 12.

In FIG. 6, the cover 32, or deck lid, is shown pivoted on a hinge 50 to its open position. A prop 52 supports the cover 32 in its open position. An end flange 54 is provided on the rear most portion of the cover 32 that is adapted to be received on a flange seat 56 formed on the upper edge of the face plate 34. When the face plate 34 is positioned against the rear end 14 of the vehicle body 18, the end flange 54 of the cover 32 receives and may be locked to the flange seat 56 of the face plate 34. The sub-compartments 24 are shown in their position overlying the base 22.

In FIG. 7, the sub-compartments 24 are shown pivoted to their position wherein they are outboard of the base 22. The primary compartment 22 is preferably guided on a drawer slide 60. As shown in FIGS. 6 and 7, two drawer slides are provided on opposite sides of the primary compartment 20. However, it will be readily understood that single drawer slide or guide could be provided centrally under the primary compartment 20 within the scope of the present invention. When the primary compartment 20 is initially opened, a gap 62 is formed between the face plate 34 and the side walls 28. This gap is filled by rotation of the sub-compartments 24 to the position shown in FIG. 7.

While the best mode for carrying out the invention has been described in detail, those familiar with the art to which this invention relates will recognize various alternative designs and embodiments for practicing the invention as defined by the following claims.

What is claimed is:

1. A rear storage compartment in combination with a vehicle comprising:

a primary compartment mounted on the vehicle for sliding movement between a closed position and an open position;

a sub-compartment having vertically extending sidewalls connected by a vertical pivot to the primary compartment, the sub-compartment being pivotable when the primary compartment is in its open position between a first position with the sub-compartment being stored within the primary compartment and a second position not overlying the primary compartment.

2. The rear storage compartment of claim 1 wherein two sub-compartments connected by a vertical pivot are provided.

3. The rear storage compartment of claim 2 wherein the primary compartment has two side walls and the two sub-compartments are each pivotally mounted to one of the two side walls.

4. A rear storage compartment in combination with a vehicle comprising:

a primary compartment mounted on the vehicle for sliding movement between a closed position and an open position;

a sub-compartment pivotally mounted to the primary compartment that is pivoted when the primary compartment is in its open position between a first position overlying the primary compartment and a second position not overlying the primary compartment;

the primary compartment has at least one side wall extending rearwardly from a front wall of the primary compartment, the primary compartment having a face plate attached to a rear edge of the primary compartment, a gap being formed between the side wall and the face plate as the primary compartment is shifted rearwardly relative to the front wall to its open position, the sub-compartment being pivotally mounted to the side wall for movement between a first position adjacent the side wall and a second position adjacent the gap formed when the primary compartment is in its open position.

5. The rear storage compartment of claim 4 wherein the sub-compartment has a recess and the face plate is partially received in the recess when the sub-compartment is in its second position to selectively lock the storage compartment in its second position.

6. A rear storage compartment in combination with a vehicle comprising:

a primary compartment mounted on the vehicle for sliding movement between a closed position and an open position;

a sub-compartment having vertically extending sidewalls connected by a vertical pivot to the primary compartment, the sub-compartment being pivotable when the primary compartment is in its open position between a first position with the sub-compartment being stored within the primary compartment and a second position not overlying the primary compartment;

the rear storage compartment further comprising a cover pivotally secured to the vehicle that is movable between an open position wherein access is provided to the primary compartment and the pivotally mounted sub-compartment and a closed position wherein a face plate of the primary compartment is retained by the cover in its closed position.

7. A storage compartment in combination with a specialty vehicle having a body including a rear end portion defining a space in which the storage compartment is received, the storage compartment comprising:

a base connected by a slide guide to the body adjacent the space defined by the rear end portion of the body, the base being movable between a closed position in which it is confined within the space defined by the rear end portion of the body and an open position in which the base is at least partially disposed behind the rear end portion of the body;

a face plate attached to a rear edge of the base;

a side sub-compartment pivotally attached to the body adjacent the space defined by the rear end portion of the body, the side sub-compartment being pivoted between a retracted position in which it is within the space defined by the rear end portion of the body and an extended position in which it is behind the rear end portion of the body and laterally outboard of the base.

8. The storage compartment of claim 7 wherein the side sub-compartment has a bottom wall and a side wall that define an open top container, the side wall having a portion that at least partially defines a lateral wall of a central storage compartment in conjunction with the base and face plate when the base is in its open position.

9. The storage compartment of claim 8 wherein two sub-compartments are provided that at least partially define opposite side walls of the central storage compartment.

10. The storage compartment of claim 8 wherein the side sub-compartment side wall has first and second planar walls joined in a right angle relationship on one end of each planar wall and a curved wall joining another end of the planar walls.

11. The storage compartment of claim 10 wherein the side sub-compartment is rotated 180 degrees as it is moved from it retracted position and its extended position so that one of the planar walls is rotated from a first position overlying a side of the space defined by the rear end portion of the body to a second position wherein the planar wall extends rearwardly to the face plate when the base is in its open position.

12. The storage compartment of claim 7 further comprising a rear deck lid connected by a hinge to the body of the vehicle, the deck lid being movable between an open position and a closed position wherein the deck lid covers an opening in the body of the vehicle above the base plate when it is in the closed position.

13. A storage drawer in combination with a vehicle body having a compact configuration defining a compact perimeter, the storage drawer comprising:

a pull out drawer having a face plate and a base plate, the pull out drawer being movable on at least one drawer slide between a closed position wherein the pull out drawer is disposed within the compact perimeter and an open position wherein the pull out drawer is extended outside of the compact perimeter;

at least one drawer compartment pivotally secured to the pullout drawer and being movable between a closed position wherein the drawer compartment is within the compact vehicle perimeter, and an open position wherein the drawer compartment is disposed rearward of the compact vehicle perimeter and laterally outboard of the pullout drawer; and a rear deck lid is connected by a hinge to the body of the vehicle, the deck lid being movable between an open position and a closed position wherein the deck lid covers an opening in the body of the vehicle above the pull out drawer when the pullout drawer is in the closed position.

14. The storage drawer of claim 13 wherein two drawer compartments are provided on opposite lateral sides of the pull out drawer.

15. The storage compartment of claim 13 wherein the drawer compartment has a bottom wall and a side wall that define an open top container, the side wall having a portion that at least partially defines a lateral wall of a central storage compartment in conjunction with the base and face plate when the base is in its open position.

16. The storage compartment of claim 14 wherein the two drawer compartments have first and second planar walls joined in a right angle relationship on one end of each planar wall and a curved wall joining another end of the planar walls.

17. The storage compartment of claim 16 wherein each of the drawer compartments are rotated as they are moved between their retracted position and their extended position so that each of the drawer compartments is rotated from a first position overlying the pull out drawer to a second position wherein each of the drawer compartments is laterally outboard of the pull out drawer.

* * * * *